United States Patent [19]
Niecke

[11] 3,919,615
[45] Nov. 11, 1975

[54] POWER BELT
[76] Inventor: Ronald Niecke, 93 Ashburne Drive, Islington, Ontario, Canada
[22] Filed: Mar. 18, 1974
[21] Appl. No.: 452,169

[52] U.S. Cl. .................... 320/2; 224/5 H; 224/23; 307/150
[51] Int. Cl.² .................. H02J 7/00; A45F 5/00
[58] Field of Search ..... 320/2; 307/150; 240/6.4 W; 224/5 H, 13, 20, 22, 23; 315/76

[56] References Cited
UNITED STATES PATENTS
| | | | |
|---|---|---|---|
| 1,968,767 | 7/1934 | Howard | 224/23 X |
| 2,659,854 | 11/1953 | Wengel | 315/76 X |
| 3,274,476 | 9/1966 | Wildum | 320/2 |
| 3,360,708 | 12/1967 | Palmer-Persen | 320/2 |
| 3,673,485 | 6/1972 | Vital | 320/2 |

Primary Examiner—Harold Broome
Assistant Examiner—Robert J. Hickey
Attorney, Agent, or Firm—Rogers, Bereskin & Parr

[57] ABSTRACT

A power belt which comprises a belt member adapted to be secured around the waist of a person using the belt, and a plurality of pockets carried by the belt member. Electrical cells are contained in all but one of these pockets and are series connected. The remaining pocket contains an inverter unit to which the cells are connected, whereby an a.c. output is obtained. Further, the inverter unit is removably fitted to a connector unit in the pocket, by way of a push-in coupling designed to allow the inverter to be inserted in an alternative position in which it can be used as a charger for recharging the cells. In another aspect of the invention, a releasable fastening is provided between the upper margin of the belt member and the backs of the pockets to enable the electrical connections between the cells and inverter unit to be exposed for maintenance purposes. According to a still further aspect of the invention the belt member is made of a foldable material and the pockets are disposed to allow convenient folding of the belt with the pockets arranged side by side in a compact arrangement for ease of storage and transportation.

12 Claims, 6 Drawing Figures

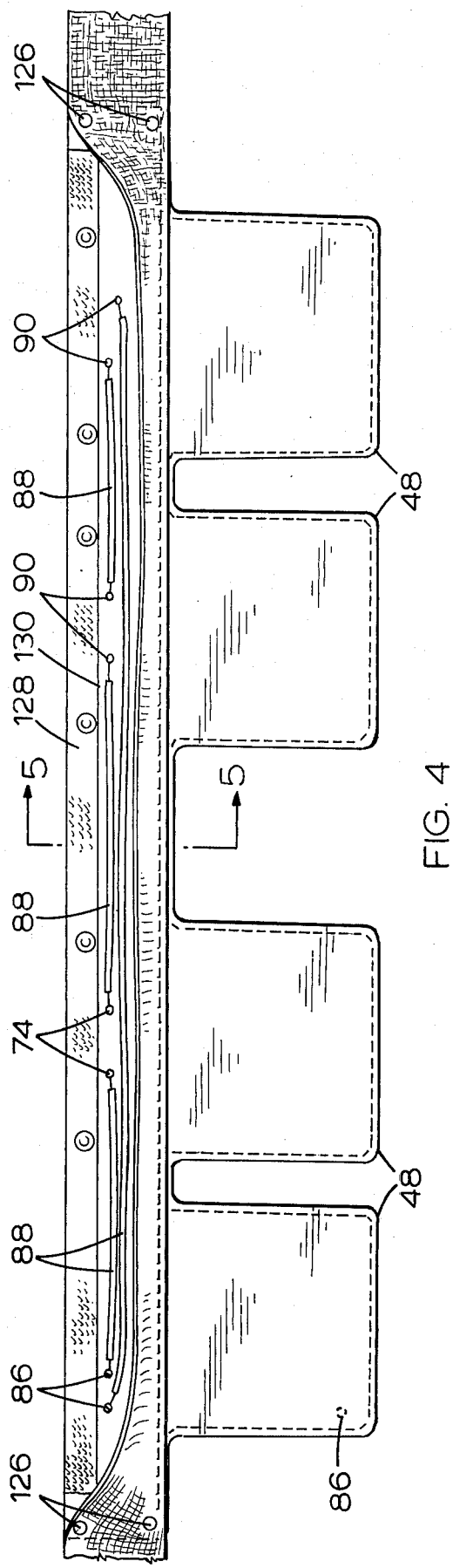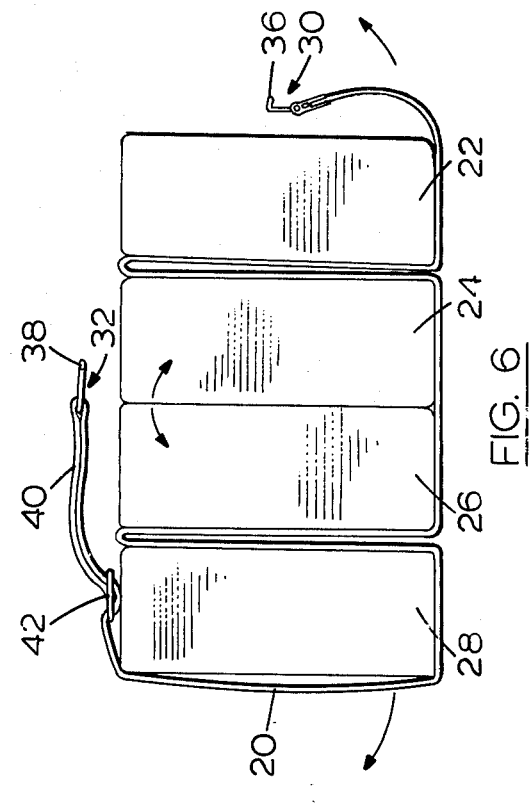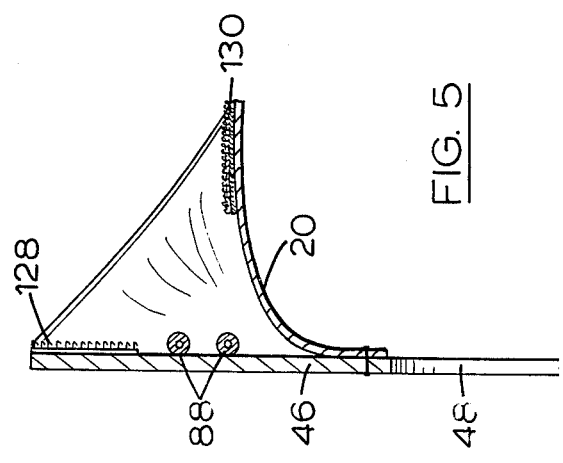

POWER BELT

This invention relates to a power belt for use as a portable electrical power supply for operating electrical movie cameras and other devices.

Although in the following description, reference will be confined to power belts for use with movie cameras, it is to be understood that there is no limitation in this and that a power belt according to the invention may be used in any situation in which a portable electrical power supply is required. Examples of other potential applications of a power belt according to the invention are in the operation of video tape cameras, t.v. cameras and electronic military equipment.

A cameraman using a portable movie camera wears a power belt around his waist and connects his camera electrically into an output socket on the belt. The belt carries electrical cells connected to the output socket. It will be appreciated that the belt allows the cameraman considerable mobility whilst ensuring a continuous power pupply. The cells are normally rechargeable and are commonly of the nickle cadmium type. A charger is often built into the belt so that the cells can be recharged by simply connecting the charger to the mains electrical supply when the belt is not in use.

An example of a prior art power belt is disclosed in U.S. Pat. No. 3,274,476. The belt disclosed in that patent comprises an elongate and flat belt member which carries a plastics molding shaped to define a plurality of pockets receiving electrical cells. The cells are series connected to provide a d.c. output of the required voltage. It will be appreciated that because this belt can be used only with cameras having d.c. motors, the cameraman using a conventional power belt of this type is denied the many advantages of using the wide range of movie cameras which have a.c. motors.

In one aspect the present invention provides a power belt which comprises a belt member adapted to be secured around the waist of a person using the belt, and a plurality of pockets carried by the belt member. Electrical cells are carried in all but one of these pockets and are series connected. The remaining pocket contains an inverter unit to which the cells are connected whereby an a.c. output is obtained. This enables the belt according to the invention, to be used to power movie cameras having a.c. motors. Further, the inverter unit is removable, being fitted to a connector unit in the pocket by a push-in coupling designed to allow the inverter to be inserted in an alternative position in which it can be used as a charger for recharging the cells.

A further disadvantage of the prior art type of belt referred to above is that the plastics molding is of generally circular shape (to conform to the wearer's waist), which makes the belt inconvenient to handle and store when not in use. Further, the plastics material from which the molding is normally made is comparatively rigid which prevents the belt being folded. Attempts to fold the belt and flexing of the plastics material, result in the moulding cracking and possibly in damage to the cells and to the electrical connections.

According to a further aspect of the invention the belt member is made of a foldable material and the pockets are disposed to allow convenient folding of the belt with the pockets arranged side by side in a compact arrangement for ease of storage and transportation.

A still further problem with a belt of the general type disclosed in the above U.S. patent is that, in production belts, the slide fastener shown in the patent is often omitted and the moulding produced as a sealed unit. This prevents access to the electrical connections between the cells in the belt for maintenance and repair purposes.

In accordance with a still further aspect of the invention; releasable retaining means are provided between the upper margin of the belt member and the backs of the pockets to enable the electrical connections to be exposed for maintenance and repair purposes.

The invention will be better understood with reference to the accompanying drawings, in which:

FIG. 4 is a back view of the belt arranged in a flat condition;

FIG. 5 is a vertical sectional view on line 5—5 of FIG. 4; and,

FIG. 6 is a top view showing the belt of the previous FIG. 5 in a folded condition.

Figure 1:
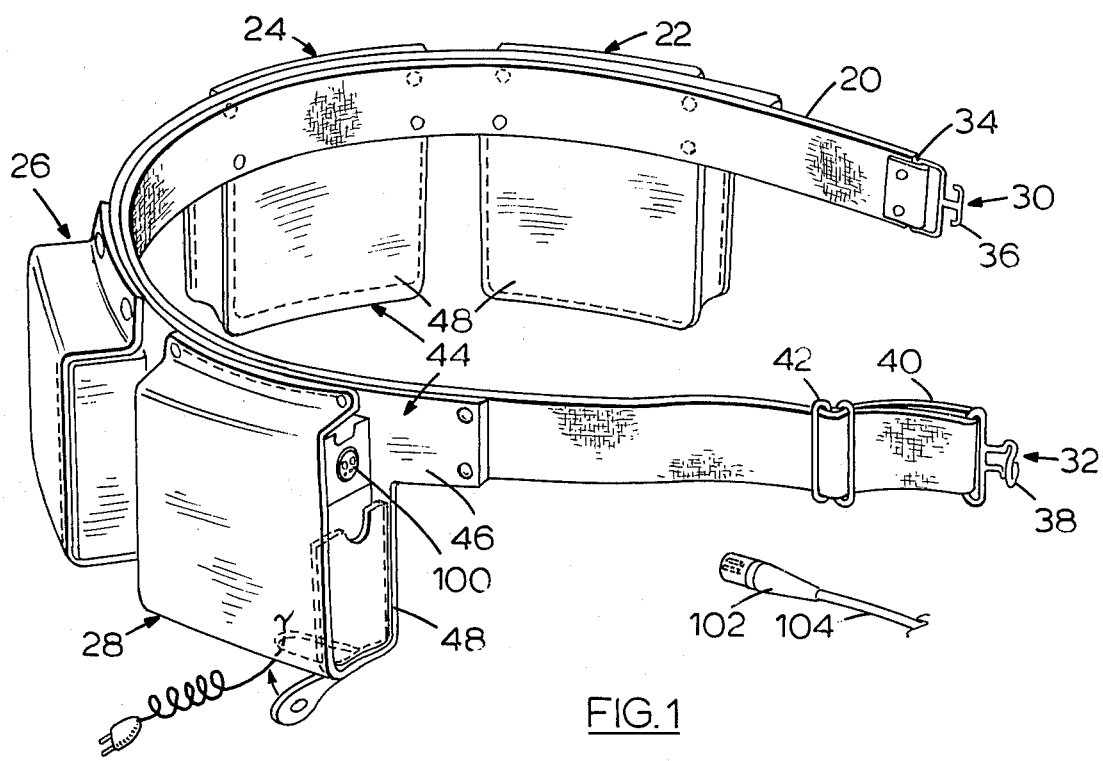
FIG. 1 is a perspective view of a power belt, in accordance with one embodiment of the invention.

The belt shown in the drawings has been designed primarily for use as a power source for an electrically operated, portable movie camera. Referring first to FIG. 1, the belt includes a strip 20 of webbing which carries four pockets 22, 24, 26 and 28. The first three pockets, 22, 24 and 26 contain nickel-cadmium cells which are series connected, as will be described. The fourth pocket 28 contains an inverter unit which receives the output from the cells contained in the other three pockets and from which the output of the belt is taken.

Webbing strip 20 may be made of any convenient hard wearing, flexible material. Preferably it is of a woven man-made fibre. In any event, the strip 20 is adapted to be secured around the person's waist by a buckle comprising two inter-engageable buckle members 30, 32, carried by respectively opposite ends of the strip 20. As can be seen, buckle member 30 is held in a fixed loop 34 formed on one end of the belt and carries a T-shaped buckle formation 36. The other buckle member is carried by the opposite end of strip 20 and is shaped to define an eye 38, dimensioned to receive the T-shaped buckle formation 36 of member 30 when the belt is fastened. Member 32 is held by a loop 40, which is adjustable in size by means of a sliding fastener 42, arranged on the main portion of the belt and connected to the end of the loop. By moving fastener 42 along the main portion of the belt, the size of the loop and hence the length of strip 20 can be adjusted to suit the waist size of the wearer.

The pockets 22, 24, 26, 28 are in this embodiment made of leather in view of its hard wearing properties, although it is to be understood that there is no limitation in this respect and that the pockets may be made of any sufficiently hard wearing material. In any event, the backs of all four pockets are formed by parts of a common backing member 44, mounted on the webbing strip 20. Member 44 is cut from a single piece of leather in a shape which defines a top portion 46 of approximately the same depth as the strip 20, and four rectangular depending portions 48, which form the backs of the pockets 22, 24, 26, 28.

As has been mentioned above, the three pockets, 22, 24, 26 carry electrical cells. These pockets are identical with one another and one of them is shown individually in FIG. 2. This view may be taken as showing any one of the three cell-carrying pockets, but in this instance it will be assumed that the view shows pocket 26. It will be appreciated that a portion of the webbing strip 20 is visible in FIG. 2, as is part of the backing member 44, comprising one of the rectangular portions 48 and a section of the top portion 46.

Pocket 26 is of rectangular shape in front view and is made up of a front panel 50, also of rectangular shape, and two rectangular end panels 52. The bottom margin of the front panel 50 is secured along the bottom edge of the rectangular depending portion 48 of backing member 44 by a line of stitching partly visible at 54 in FIG. 2. Similarly, one longitudinal margin of each end panel 52 is stitched along one side edge of portion 48 by a line of stitching 56. The opposite longitudinal margin of each panel 52 and its bottom margin are both stitched to the corresponding marginal portions of front panel 50 by stitching 58 to form the rectangular pocket. The top portion 60 of panel 50 is free and carries, adjacent each of its corners, the female part 62, of a press stud fastener. Corresponding male fastener parts 64 are provided on the top portion 46 to enable the top of the pocket to be releasably closed, as shown in FIG. 1. In addition, the top portions 66 of the end panel 52 are free, forming flaps, which can be tucked inwardly under the top portion of panel 50.

Figure 2:
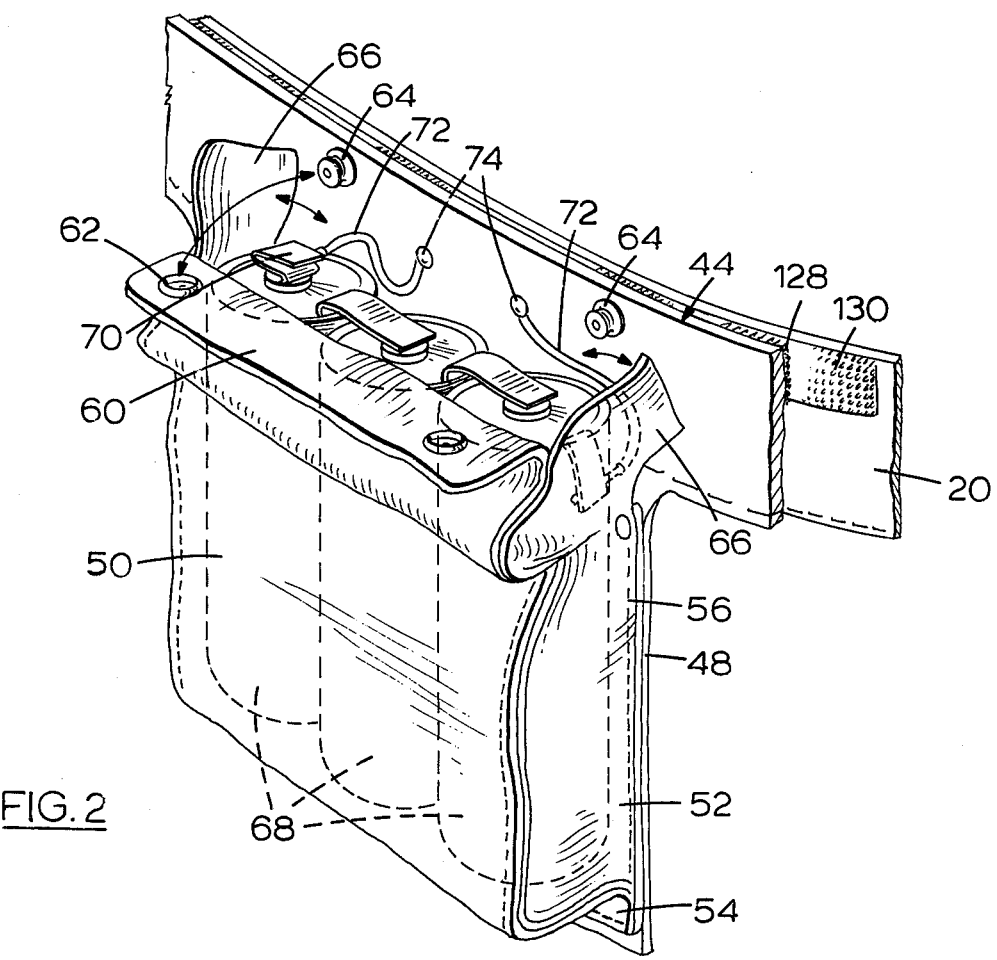
FIG. 2 is a perspective view of one of the pockets of the belt shown in FIG. 1.

In FIG. 2, three electrical cells 68, are shown in pocket 26. These cells are entirely conventional nickel cadmium cells and, as can be seen, are series connected by terminal strips 70. Output leads 72 from the end two cells are taken to terminals 74 on backing member 44. These two terminals extend through the member to the rear side thereof where they are soldered to leads to be described later.

It will be appreciated that, when the flaps 66 on the end panel 52 are tucked inwardly on top of the cell and the top portion 60 is secured in position by means of the press stud fasteners referred to, the cells are securely enclosed within the pocket and protected against damage between cells and soldered terminals and against the ingress of foreign materials. However, access to the batteries is readily obtainable by simply undoing either one or both of the press studs and folding back the portion 60 of the pocket front panel 50 and either or both end flaps 66.

Figure 3:
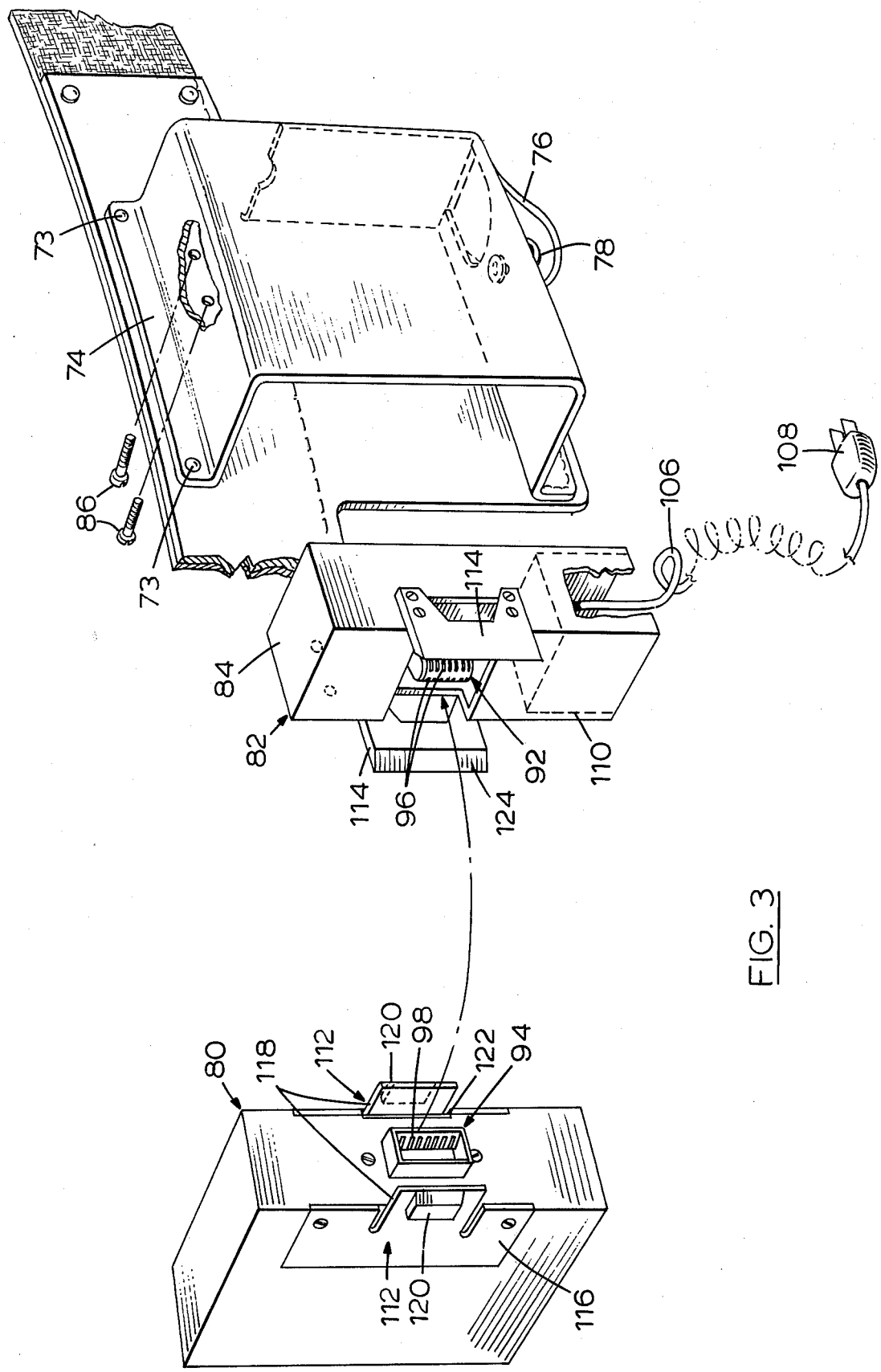
FIG. 3 is an exploded perspective view of the pocket shown adjacent the right hand end of the belt in FIG. 1.

The fourth pocket 28 is of the same general shape as the other three pockets and is shown in FIG. 3. In FIG. 3, prime reference numerals are used to denote parts of the pocket which are the same as parts shown in FIG. 2. It will be seen that the front panel 50 of pocket 28 is permanently secured to the backing member 44 along its upper edge by two rivets 73 and a line of stitching 74. Additional differences are that pocket 26 is open at the left hand side and that the right hand end panel 52 terminates approximately half way up the pocket (see FIG. 1). Further, a flap 76, secured by a press stud 78 is provided in the bottom wall of pocket 28.

Pocket 28 carries the inverter unit of the power belt. This unit is denoted 80 in FIG. 3, in which view it is shown in perspective, removed from the pocket.

Unit 80 is adapted to be connected to the cells in pockets 22, 24, 26 by a connector unit 82 to which the inverter can be coupled by a push-in coupling, (to be described). Unit 82 has a box form casing 84 and is normally secured in the right hand end of pocket 28 in FIG. 3. The unit is held in position by three screws which extend through the backing member 44 from the rear side thereof and are received in complementary screw threaded holes (not visible) in the casing 84. The heads of these screws are visible at 86 in FIG. 4. In addition to holding the unit 82 in position, the top two screws serve as terminals by which the unit is connected to the cells in pockets 22, 24 and 26. Thus, leads 88 extend between these screws and terminals on the rear face of backing member 44 connected to the cells in the individual pockets. Two of these terminals are denoted 74, having been referred to in connection with FIG. 2; the corresponding terminals for the cells in the other pockets are denoted 90. The leads 88 are soldered to the terminals 74 and 90 but are connected to the screw heads 86 by way of loops formed on the ends of the leads through which the screws extend. Inside the connector unit 82, these screws are electrically connected with the above-mentioned push-in coupling between unit 82 and the inverter unit 80.

This coupling has two parts; a male part denoted 92, carried by the terminal unit 82, and a female part denoted 94, carried by the inverter unit 80. The male part 92 of the coupling comprises a generally rectangular body of an insulating plastics material, along each side of which is embedded a series of conductive terminal strips 96. The female part 94 of the coupling is formed by a body of a similar insulating plastics material, which is shaped to define a recess to receive the male part 92. Further metal terminal strips 98, similar to strips 96, are provided on the inner surfaces of the side walls of the female part 94.

The respective sets of terminal strips 96, 98 are arranged so that the inverter unit can be plugged into the connector unit 82 in one of two alternative positions, in each of which different sets of terminal strips are in engagement with one another. Thus, the inverter unit 80 can be inserted into the terminal unit 82, either in the position in which it is shown in FIG. 6, or the unit can be turned upside down, as indicated by arrow B, and inserted in an alternative position.

In the position shown, unit 80 performs its normal function as an inverter, converting the d.c. output of the cells in pockets 22, 24 and 26 of the belt to an a.c. output. In the alternative position, unit 80 acts as a charger for the purpose of recharging the cells, provision being made to couple the unit to an external electricity supply at this time, as will be described.

The arrangement of the respective sets of terminal strips 96, 98 of the coupling is such that, in the normal position of the inverter unit as shown, the output from the cells passes through unit 80 to an output socket arranged at the side of connector unit 82 remote from the male coupling part 92. This socket is not visible in FIG. 3, but can clearly be seen at 100 in FIG. 1. It will be noted that the socket is positioned adjacent the top of the inverter unit, above the level of the top of the end panel 52 of pocket 28 so as to be readily accessible at all times. Socket 100 is a conventional output socket into which can be fitted the standard input plug of a movie camera. In FIG. 1, such a plug is indicated at 102, connected to the input lead 104 of a movie camera.

When the inverter unit 80 is in its other position (in which it acts as a charger), the respective series of terminal strips 96, 98 connect the electric cells, through the unit 80 to an input lead 106 carrying a standard plug 108 at its outer end. In this condition, if plug 108 is connected to an external electrical power supply, the cells are re-charged through unit 80. It will be noted that the casing 84 of the terminal unit 82 is shaped to define, at its lower end, a recess 110 which is of box form and which serves as a storage compartment for the lead 106 and plug 108 when the belt is in normal use. In this connection, it will be realized that the flap 76 on pocket 28 referred to above is provided to close off the bottom of this recess and to retain the mains lead and plug when the belt is in normal use. When the lead 106 is to be withdrawn for charging purposes, flap 76 is pivoted downwardly by releasing the press stud 78 to allow access to the storage compartment 110.

The inverter unit 80 is retained in engagement with the connector unit 82 in either of the two positions mentioned above by means of inter-engageable locking formations denoted 112, 114 of the inverter unit and connector unit respectively. The locking formations 112 on the inverter unit 80 comprise, at each side of the unit, a spring steel plate 116 having a forwardly projecting part 118 provided at its outer side with a wedge form locking member 120. By virtue of the fact that the plates 116 are of spring steel, the projecting parts 118 thereof are deflectable towards one another in engaging the locking formations 114 on the terminal unit 82. Further, to allow additional inward deflection of the part 118, the body of the terminal unit is recessed at each side at 122, behind the part 118.

The formations 114 comprise generally C-shaped plates which are screwed to the sides of the terminal unit and which have chamfered leading edges 124. Accordingly, when the inverter unit 80 is engaged with the connector unit 82, these leading edges deflect the locking members 120 inwardly so that the members 120 can pass along the inside surfaces of the plates 114 and snap into the recesses defined by the C-shape of the plates.

Release of the inverter unit 80 is effected by exerting manual pressure on each of the locking members 120 so as to move the members towards one another by deflecting the parts 118 of plates 112, allowing the members to clear the recesses and pass inwardly between the plates 114 as the inverter unit is withdrawn. Obviously, at this time, the inverter unit 80 and terminal unit 82 will be within the pocket 28 of the belt. This manual pressure will accordingly have to be exerted on the backing member 44 of the belt and on the front panel 50 of pocket 28. However, it is found in practice that this presents no difficulty and that the person using the belt can readily exert the required pressure at the appropriate location by squeezing between thumb and forefinger of one hand whilst withdrawing the inverter unit 80 from pocket 28 using the other hand.

It should at this stage be noted that the inverter unit 80 is of standard solid state construction being designed to provide an accurate, crystal-controlled a.c. output. However, in view of the fact that the unit is of standard construction, a detailed description is not believed to be necessary.

It should also be noted that the inverter unit 80 may be used separately from the belt in conjunction with any other source of low voltage d.c. electric current to provide an a.c. output. For example, the unit could be used in an automobile to enable an a.c. output to be obtained from the 12-volt vehicle battery. In this event, the automobile will be provided with a fitment similar to connector unit 82 into which the inverter can be plugged. This fitment will not have a charging lead but, otherwise, will be basically the same as unit 82, having an a.c. output socket and being connected to the vehicle battery by way of terminals similar to those on unit 82.

Referring now to FIGS. 4 and 5, it will be that the leads connecting the dry cells to one another and to the terminal unit 82 run behind the backing member 44 of the belt and are soldered to terminals passing through the member to the cells and connector unit as described above. According to an account of the present invention, these leads and terminals are normally covered by the webbing strip 20 of the belt, but provision is made to permit access to the leads and terminals for maintenance purposes, as will now be described.

Backing member 44 is secured to the webbing strip 20 of the belt by four rivets 126, arranged in pairs at respectively opposite ends of the top portion 46 of the backing member 44. In addition, strip 20 is stitched along its lower marginal edge to the top portion 46 of member 44. The upper marginal edge portion of strip 20 is normally secured to the top portion 46 of member 44 by means of strips of "Velcro" (Trade Mark) secured to opposing faces of strip 20 and portion 46. These two strips are denoted 128 and 130 respectively in FIGS. 4 and 5. As is well known, "Velcro" comprises two cohesive fabrics, the first of which has a surface covered with fibre loops and the second of which has a surface covered with fine hooked tines which catch in the loops of the other fabric to hold the fabrics together. In this particular instance, strip 128 may be the hooked fabric and strip 130 the fabric covered with loops, although the arrangement may be reversed.

As can clearly be seen from FIGS. 4 and 5, the provision of the "Velcro" strips allows the portion of the webbing strip 20 which covers the leads 88 and terminals 84, 90 to be detached along its upper edge from the backing member 44 so as to allow access to the leads and terminals for maintenance purposes. Further, the strip 20 can be readily re-attached to the backing member by simply pressing the two "velcro" strips together.

Within the scope of the invention, retaining means other than "Velcro" may be used. An alternative similar product which may be used employs a first fabric having its surface covered with fibre loops and a second fabric having its surface covered with tines, each of which has a minute-mushroom shaped head for engagement with the loops of the other fabric. Other alternatives are press studs or a lace passing through eyelets in the respective parts of the belt.

FIG. 6 illustrates how the belt shown in the other figures can be folded into a compact form for storage and/or transportation, by virtue of the flexible portions of strip 20 and backing member 44 between the individual pockets of the belt. With this facility in mind, the belt has been designed so that the spacing (denoted S in FIG. 3) between the two centre pockets 24, 26 of the belt is substantially equal to the thickness of those pockets so that these two pockets can be folded together face-to-face, as shown in FIG. 5, with the portion of the belt therebetween lying against the adjacent ends of the pockets. The compactness and ease of folding of the belt is further enhanced by the fact that the pockets are all of identical shape.

It is of course to be understood that the number of pockets on the belt can be varied within the broad scope of the invention. Moreover, if the belt were to be used as a d.c. power source the inverter could be omitted, in which case all of the pockets or the belt would contain electrical cells.

What I CLAIM IS:

1. A power belt comprising:
   a belt member adapted to be secured around a person's waist in use;
   a plurality of pockets coupled to said member and spaced along it;
   an inverter unit adapted to be received in one of said pockets, the remaining pockets being adapted to receive electrical cells;
   a connector unit in said one pocket, the unit including output means connectible to a device to be powered by the belt and input means connectible to an external power supply;
   means adapted to connect in series, electrical cells received in said remaining pockets, and to connect said cells to the connector unit;
   and a plug-in coupling for connecting together said inverter unit and said connector unit in one of two positions, in the first of which the inverter unit operates in its normal mode to invert the d.c. voltage from the cells when the belt is in use, whereby an a.c. voltage is available at said output means, and in the second of which the inverter unit operates as a charger when an external power supply is connected to the input means, to enable the cells to be recharged.

2. A power belt as claimed in claim 1, wherein the plug-in coupling comprises a male coupling part on one of said units, a complementary female coupling part on the other of said units, and releasable locking means to hold the inverter unit and connector unit together with the coupling parts engaged with one another.

3. A power belt as claimed in claim 2, wherein the releasable locking means comprises inwardly deflectable resilient latch members on the inverter unit, and retaining means on the connector unit for the latch members, said retaining means being positioned to inwardly deflect the latch members as the inverter unit is plugged into the connector unit, the latch members returning to their initial positions after such deflection to engage the retaining means.

4. A power belt as claimed in claim 1, wherein the input means of the connector unit is adapted to be coupled to an external source of power by a lead and plug which are normally received in a storage compartment in the connector unit, but which can be withdrawn for use in recharging the cells.

5. A power belt comprising:
   an elongate flexible member adapted to be secured around at least part of a person's waist;
   a plurality of pockets mounted on the side of said member which is outermost in use, at least some of said pockets being adapted to receive electrical cells;
   electrical connections for connecting cells in said pockets, at least parts of said connections passing through the elongate member from said pockets to the inner side of the member and extending along said inner side;
   cover means for the parts of said electrical connections at the inner side of the elongate member, the said cover means and elongate member being permanently secured together along a bottom marginal portion of the cover means; and,
   releasable retaining means between an upper marginal portion of the cover means and the elongate member, said retaining means comprising strips of cohesive fabrics secured in corresponding positions on the cover means and elongate member respectively, whereby the fabric strips adhere to one another to secure the upper marginal portion of the cover means to the elongate member, but can be separated by tearing the fabrics apart to allow access to the parts of said electrical connections at the inner side of the elongate member.

6. A power belt as claimed in Claim 5, wherein one of said fabrics has a surface covered with fine hairs and the other fabric has a corresponding surface covered with hooked tines which, when the two fabrics are in contact, engage the hairs on the other fabric to retain the fabrics together, the fabrics being separable by tearing the same apart to release the hairs from the hooks.

7. A power belt as claimed in claim 6 wherein the cover means comprises a flexible web adapted to be secured around a person's waist in use, and wherein the said elongate flexible member carrying the pockets is permanently secured to the web at each opposite end and along its bottom marginal portion, the upper 4arginal portion of the member and the corresponding part of the web being releasably held together by said fabrics.

8. A power belt as claimed in claim 5 and further comprising:
   an inverter unit for engagement in one of said pockets, the remaining pockets being adapted to contain said cells, the cells being connected electrically in series by said electrical connections and connected to the inverter unit;
   a connector unit in said one pocket, the connector unit being coupled to the inverter unit and including output means connectible to a device to be powered by the belt, and input means connectible to an external electrical power supply;
   a plug-in coupling for connecting together said inverter unit and said connector unit in one of two positions, in the first of which the inverter unit operates in its normal mode to invert the d.c. voltage from the cells when the belt is in use, whereby an a.c. voltage is available at said output means, and in the second of which the inverter unit operates as a charger when an external power supply is connected to the input means to enable the cells to be recharged.

9. A power belt as claimed in claim 5, wherein the elongate flexible member is of a foldable material, wherein at least those parts of the electrical connections at the inner side of the elongate member are flexible, wherein there are at least two pairs of pockets, each pocket being of generally box-form, the pairs of pockets being spaced along the member by a distance at least substantially equal to the sum of the thicknesses of the adjacent pockets in the respective pairs, whereby the said adjacent pockets can be folded together in face-to-face relationship with the elongate member extending along their adjacent ends, and wherein the pockets in each pair are spaced from one another by a smaller amount sufficient to enable them to be folded together in back-to-back relationship with the elongate member folded back on itself between the two pockets.

10. A power belt comprising:
   a relatively norrow elongate belt member which is of a foldable material and which has opposite outer ends;
   means at said outer ends of the belt member for coupling said ends together to secure the belt member about a person's waist; and,
   at least two pairs of generally box form pockets depending from said belt member, each pocket being of a height substantially greater than the width of the belt member, and at least some of said pockets being adapted to carry electrical cells, the respective pairs of pockets being spaced from one another along the belt member by a distance at least substantially equal to the sum of the thicknesses of adjacent pockets in the respective pairs, so that the said adjacent pockets can be folded together in face-to-face relationship with the belt member extending along their adjacent ends, the pockets in each pair being spaced from one another by a smaller distance sufficient to enable them to be folded together in back-to-back relationship with the belt member folded back on itself between these two pockets, and the pockets in the respective pairs nearest said outer ends of the belt member being spaced substantially from said outer ends such that, when the belt is in use, said pockets rest generally on the hips of the wearer of the belt, and the remainder of the pockets are located across the wearer's back.

11. A power belt comprising:
   a belt member which is adapted to be secured about a person's waist and is of a foldable material;
   at least two pairs of generally box-form pockets attached to the outer side of the belt member, at least some of said pockets being adapted to carry electrical cells; and
   flexible electrical connections for connecting cells in said pockets;
   said pairs of pockets being spaced along the belt member by a distance at least substantially equal to the sum of the thicknesses of the adjacent pockets in the respective pairs, whereby the said adjacent pockets can be folded together in face-to-face relationship with the belt member extending along their adjacent ends, and wherein the pockets in each pair are spaced from one another by a smaller amount sufficient to enable them to be folded together back-to-back with the belt member folded back on itself between the two pockets;
   an inverter unit adapted to be engaged in one of said pockets, the remaining pockets being adapted to receive electrical cells, said electrical connections being adapted to connect cells in said pockets in series and to connect the cells to the inverter unit;
   a connector unit in said one pocket and coupled to the inverter unit, the connector unit including output means connectible to a device to be powered by the belt, and input means for connection to an external power supply; and,
   a plug-in coupling for connecting together said inverter unit and said connector unit is one of two positions, in the first of which the inverter unit operates in its normal mode to invert the DC voltage from the cells when the belt is in use, whereby an AC voltage is available at said output means, and in the second of which the inverter unit operates as a charger when an external power supply is connected to the input means to enable the cells to be recharged.

12. A power belt as claimed in claim 11, in which at least parts of said electrical connections pass through the elongate member from said pockets to the inner side of the member and extend along said side, and in which the belt further comprises:
   cover means for said parts of said electrical connections at the inner side of the belt member;; and,
   releasable retaining means which normally secures the cover means to said inner side of the belt member over said parts of the electrical connections.

* * * * *